May 12, 1970
R. S. OLSON ET AL
3,511,597
PROCESS FOR SEPARATING BERYLLIUM FROM
IRON, ALUMINUM, THORIUM, AND
THE RARE EARTHS
Filed Dec. 16, 1965
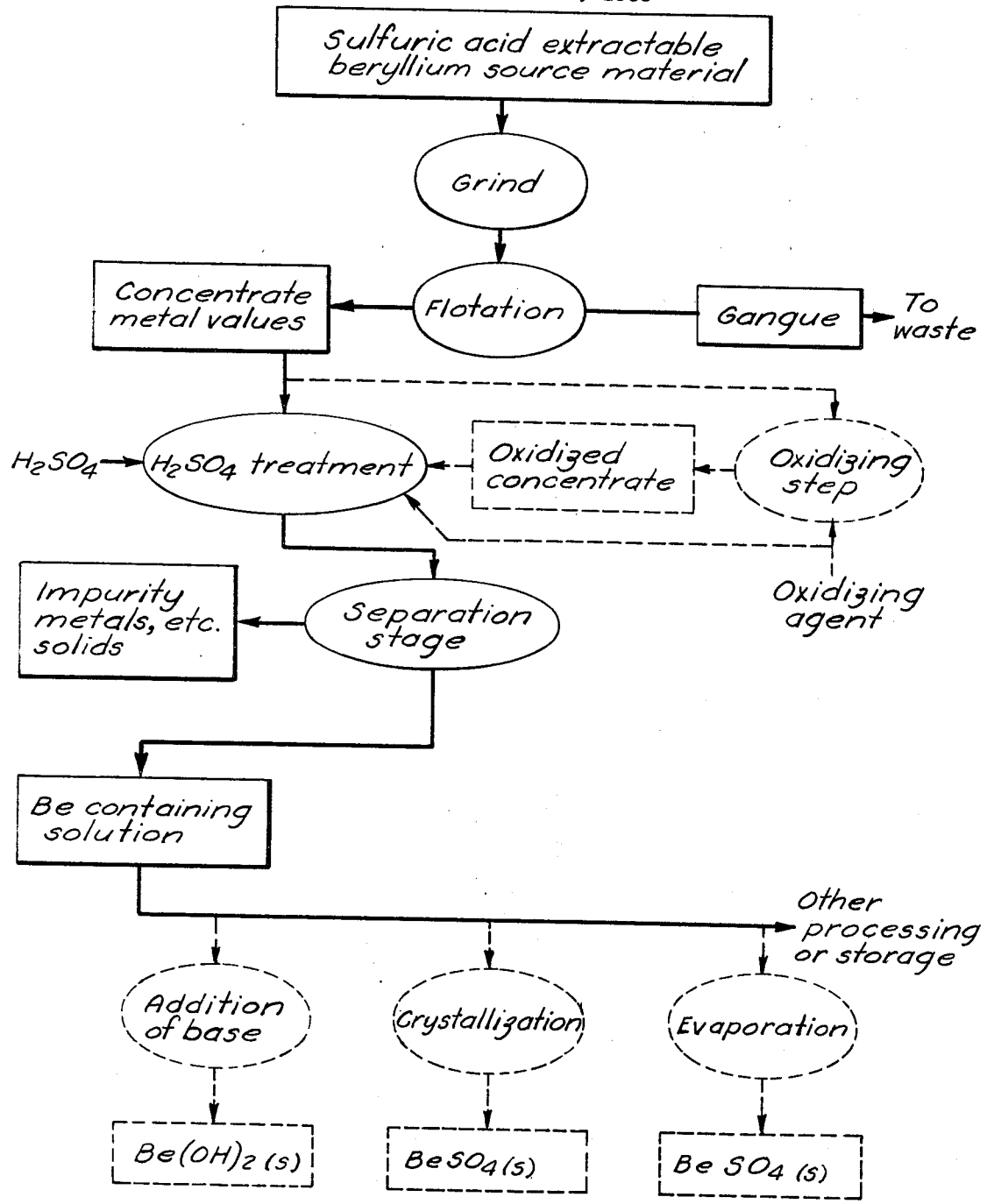
INVENTORS.
Robert S. Olson
BY Joseph P. Surls, Jr.
C. Kenneth Bjork
AGENT

United States Patent Office 3,511,597
Patented May 12, 1970

3,511,597
PROCESS FOR SEPARATING BERYLLIUM FROM IRON, ALUMINUM, THORIUM, AND THE RARE EARTHS
Robert S. Olson and Joseph P. Surls, Jr., Walnut Creek, Calif., assignors to The Dow Chemical Company, Midland, Mich., a corporation of Delaware
Filed Dec. 16, 1965, Ser. No. 514,179
Int. Cl. C22b 59/00
U.S. Cl. 23—19                3 Claims

ABSTRACT OF THE DISCLOSURE

Beryllium values are separated from other metal values, including at least iron, aluminum, thorium or rare earth values, by a process which comprises heating an aqueous acidic reaction mixture containing said values at a temperature of at least 145° C., for at least 20 minutes while providing a final hydrogen ion concentration at a maximum of about 2 normal. Beryllium values are preferentially solubilized and can be separated from the solid residual metal values by filtration.

---

This invention relates to the recovery of beryllium values from beryllium containing source materials and more particularly is concerned with a novel process for solubilizing and recovering beryllium values in high purity from mineral acid solutions which contain both beryllium and other metal values such as for example iron, aluminum, thorium and rare earths dissolved or present therein.

Beryllium values present in beryllium ores and concentrates generally are solubilized by leaching the beryllium source material with a mineral acid such as sulfuric acid, for example. This technique is effective in "opening" the ore or concentrate with respect to the beryllium values but also provides for the simultaneous solubilizing of impurity metal values such as aluminum, iron and the like also present in the ore. Because of the presence of these impurities, heretofore it has been necessary to employ multi-step extraction and other processing techniques to recover the beryllium values in high purity from such acidic leach liquors. The product recovery has been hampered considerably in the processes practiced heretofore since the concentration of the dissolved beryllium usually is quite low as compared with the concentration of the impurities dissolved in such leach solutions. The impurity concentration in the leach liquor may be from two to ten times or more larger than the beryllium content of the solution.

Additionally, dissolution in mineral acids of scrap, waste and other forms of beryllium containing metals and alloys for purposes of recovering beryllium values also can produce acidic solutions containing dissolved beryllium as well as a wide variety of impurities.

It is a principal object of the present invention to provide a novel process for separating beryllium from iron, aluminum, thorium, rare earth metals and the like.

It is another object of the present invention to provide a novel process for recovering beryllium in high purity when present in solution with ions of iron, aluminum, thorium and/or rare earth metals and other materials.

It is also an object of the present invention to provide a novel, simple process for recovering beryllium values in high purity from beryllium containing materials such as ores, concentrates, acidic leach liquors and scrap metals.

It is a further object of the present invention to provide a novel process for preparing acidic aqueous beryllium solutions having minimal quantities of other metal values which is economical, does not require expensive reagents or treating materials, does not require complex processing and material transport equipment and does not require a large number of procedural steps.

These and other objects and advantages readily will become apparent from the detailed description presented hereinafter when read in conjunction with the appended claims and accompanying drawing.

The figure of the drawing is a schematic flow diagram of one embodiment of the novel process of the present invention.

In general, the present process comprises heating at a predetermined temperature range an aqueous acid reaction mixture containing beryllium and other metal values for a period of time under controlled conditions of acidity such that the normality of hydrogen ion ($H^+$) at the end of the processing period does not exceed 2. The reaction conditions are maintained so as to assure solubilization of the beryllium values and substantially complete hydrolysis of hydrolyzable salts or rejection of oxides and the like materials which tend to form such salts, such as for example, iron, aluminum, thorium and rare earth metals, with or without simultaneous oxidation. By the practice of the present novel process, metal impurities, such as those set forth directly hereinbefore, either remain undissolved or precipitate in the reaction mixture as hydrolysis products. The beryllium values are dissolved in the acidic reaction mass and are separated from the precipitated solids. If desired, beryllium values, in high purity, can be recovered from the so-separated solution by evaporation of the liquid phase, crystallization, precipitation and the like recovery procedures.

The term "aqueous acid reaction mixture" as used herein includes, for example, slurries of a beryllium ore or beryllium ore concentrate with an aqueous mineral acid, an aqueous slurry of a beryllium ore or beryllium ore concentrate having an acid forming anhydride (e.g. $SO_2$+oxygen) present therein, a head solution from a conventional beryllium ore leaching process or a pickle liquor or other acid solution or mixture resulting from dissolution of beryllium scrap and the like.

Ordinarily, in carrying out the instant process, a finely divided particulate solid beryllium ore or beryllium ore concentrate is heated in the presence of an aqueous mineral acid at a temperature of at least about 145° C. for a minimum of about 20 minutes while controlling the hydrogen ion normality such that the hydrogen ion concentration after the reaction period is about 1.0 normal or less.

In a preferred embodiment of the invention to assure maximum separation of beryllium from other metals, a beryllium ore or an ore concentrate is heated with hydrochloric acid, nitric acid, sulfuric acid or in the presence of water, sulfur dioxide and an oxidizer such as air for example, at a temperature of from about 175° C. to about 250° C. for a period of time of from about 20 minutes to about 24 hours while maintaining the final hydrogen ion normality at from about 0.2 to about 0.5.

Ordinarily the heating step is carried out in a closed reactor at autogeneous pressure although pressures in excess of that generated during the reaction can be employed if desired.

In the actual performance of the present novel process, hydrogen ions are formed as one product of the hydrolysis of certain metal salt impurities. To achieve the maximum separation of beryllium from other insoluble impurities and hydrolyzable metal values, as listed hereinbefore, which ordinarily are present in beryllium ores, concentrates, leach liquors and waste solutions, a maximum hydrogen ion normality of about 2 is maintained in the reaction mass. Usually the hydrogen ion concentration is maintained at a normality below 1.0 and preferably is maintained at a normality of from about 0.2 to about 0.5. To assure the maintenance of the requisite hydrogen ion normality for a given beryllium source material, the actual quantity of mineral acid to be employed or the initial hydrogen ion concentration of an acid head solution from conventional ore opening can be determined and/or adjusted to account for the concentration of hydrolyzable impurity metal values present in the initial reaction mass. If an excess of hydrogen ion originally is present, or is produced during the process, addition of base can be used to maintain the requisite normality during the period required for the hydrolysis. By maintaining the reaction conditions within the ranges set forth hereinbefore, the maximum separation of beryllium from other metals normally associated therewith in ores, concentrates and the like, is achieved.

If a less pure beryllium product is desired, i.e. less complete separation of beryllium from insoluble or hydrolyzable metal values usually associated therewith, the reaction can be run at a higher hydrogen ion normality or can be terminated before the hydrolysis of the hydrolyzable metal salts is complete and/or the beryllium is substantially solubilized.

If iron is present as Fe(II), i.e. a valence of 2, preferably the present process is carried out in the presence of an oxidizing agent such as air, oxygen, hydrogen peroxide, metal peroxides, inorganic oxidizing salts such as alkali metal perchlorates, -permanganates, -chlorates, -periodates, -hypochlorites, persulfates and the like, oxidizing mineral acids, etc. to promote oxidation of the Fe(II) to the Fe(III) state. This oxidation step is requisite in the preparation of a high purity product since ferrous oxide is soluble in the acidic reaction medium both at high and low temperatures. At the operating temperatures of the present process, iron in the Fe(III) form is separated substantially quantitatively as anhydrous ferric oxide ($Fe_2O_3$) or, under some conditions, as a basic ferric sulfate if sulfuric acid is employed in the process.

Conveniently the oxidation of the Fe(II) values can be carried out during operation of the present process by introducing or incorporating the oxidizing agent into the acid reaction mass before or during the actual processing. For example, air can be bubbled through the reaction mixture during the heating step or quantities of oxidizing agent sufficient to oxidize the iron can be incorporated into the reaction mixture. Alternatively, any iron values in the two (ferrous) valence states which might be present in the acid solution or accessible to oxidation in the beryllium containing solid can be oxidized to the ferric state [Fe(III)] prior to heating above 145° C.

With peroxides, oxidizing acids and oxidizing salts, ordinarily these are employed in about a stoichiometrically equivalent amount as required for oxidation of the iron (II) values present. An amount in excess of this quantity can be employed, taking into account the effect of excess acid, i.e. hydrogen ion normality, on the separation of the metal values as set forth hereinbefore. With air or oxygen as the oxidizer, it is essential only that the treatment be continued until substantially all of the Fe(II) values are oxidized. Continued addition of the gases in excess of that required, however, is not detrimental.

Operability of one embodiment of the present novel process with a sulfuric acid extractable beryllium source material, such as an ore or an ore concentrate is shown in the schematic flow diagram of the drawing.

In the practice of this embodiment, the ore ordinarily first is ground and subjected to conventional flotation and classification techniques to concentrate the beryllium values and remove the gangue. Analysis of a typical beryllium ore concentrate, expressed as metal equivalent, is Be 0.3–0.4%, Fe 10–15%, rare earth oxides about 0.3%, Al about 5% and Th about 0.2%. (Concentration of the ore is not necessary for successful operation of the present process as any beryllium ore or source material from which beryllium values can be extracted with the mineral acid can be used.) The resulting concentrate is heated with sulfuric acid in accordance with the presently disclosed process conditions whereupon beryllium is solubilized and remains in solution, the other metal values being rendered substantially insoluble.

The resulting beryllium product solution readily is separated from the solid residue by filtration, centrifugation and the like liquid-solid separatory procedures known to one skilled in the art.

The beryllium product solution can be processed in a number of ways to recover the beryllium values present therein. To illustrate, beryllium sulfate in high purity, i.e. having very low concentrations of other cations and anions associated therewith can be produced directly by crystallization from and/or evaporation of the solvent; beryllium hydroxide can be precipitated from the product solution by treating the liquid mass with base, e.g. caustic soda (NaOH); beryllium carbonate can be precipitated by adding a basic carbonate, for example, sodium carbonate, to the product solution.

The recovered products can be further treated or reacted with appropriate reagents or reactants to produce beryllium oxide or beryllium salts, e.g. beryllium halides, which can serve as source materials for production of beryllium metals or other useful products.

It is to be understood that the resulting high purity beryllium sulfate product solution itself can be utilized as a reactant in subsequent processes or as a direct source of high purity beryllium sulfate.

Alternatively, as shown in the drawing, the ore concentrate can be subjected to an oxidizing treatment during the sulfuric acid treatment stage or can be separately treated with an oxidizing agent prior to the acid treatment.

The present process can be carried out in batch-type, cyclic batch or continuous operations employing acidulating techniques and reaction vessels, liquid and solids handling, transporting and processing equipment and techniques generally employed in the art.

The processing apparatus, material handling and transport equipment, storage vessels and allied equipment are to be constructed from those materials and of a design such that they possess the requisite strength and structural characteristics required for operability of the process. Also, this equipment must not be detrimentally attacked by the reactants employed or products produced.

The following examples serve further to illustrate the present invention but are not meant to limit it thereto.

EXAMPLE 1

A Seal Lake ore concentrate assaying about 0.37 weight percent beryllium, Fe~12%, Th~0.2%, Al~5%, rare earth oxides~.3% and $PO_4^{---}$ 1.6% and having a nominal particle size of about minus 200 mesh U.S. Standard Sieve was provided. About 15 grams of the ore was placed into a glass ampoule along with about 30 cubic centimeters of 2.03 N sulfuric acid (equivalent to 400 lbs. $H_2SO_4$/ton Be concentrate) and sufficient potassium perchlorate to oxidize all the iron in the ore sample, assuming that riebeckite was the iron containing material in the ore and that all iron present was Fe(II). The ampoule then was sealed.

The ampoule was fitted with a thermocouple and placed in a pressure resistant tube furnace maintained at a temperature of about 230° C. The reaction mixture was heated to furnace temperature and held at this temperature for about 1 hour, the autogeneous reaction pressure being about 470 p.s.i.g. Following the reaction period, the furnace was cooled and ampoule removed therefrom.

The reaction mixture was leached with water to remove solubilize materials therefrom.

Analysis of the resulting filtrate indicated the following composition expressed as grams/liter. (For purposes of clarification, the analytical results have been "normalized" to a basis of 1 g./liter beryllium.) Be—1.0; Al—0.03; Fe—0.015; Th—0.005; $PO_4^{---}$—0.08; rare earth oxides—0.36. The H+ normality was 0.5. The amount of beryllium solubilized and recovered was about 95% of that present in the concentrate.

This study was repeated using the same procedure and reaction conditions except that the oxidizing agent was not incorporated into the reaction mixture. Beryllium recovery again was about 95 percent. Analysis of the product filtrate "normalized" to the basis of 1 g./liter beryllium showed Be—1.0; Al—0.03; Fe—3.4; Th—0.02; $PO_4^{---}$—2.0; rare earth oxides—1.7. The H+ normality was 0.9.

EXAMPLE 2

Using the same technique, procedure and same ore concentrate (Be—0.37%) as set forth in Example 1, a number of tests were run to determine reaction times required for solubilizing the beryllium contained in the concentrate. In all of these runs the reaction temperature was about 230° C. and a pressure of about 470 p.s.i.g. and sulfuric acid of 4 to 6 normal was utilized. The amount of acid was about 400 pounds/ton of concentrate.

The results of these stduies are presented in Table I which follows.

TABLE I

| Run No. | Reaction time (minutes) | Final [H +] (N) | Beryllium solubilized (percent) |
|---|---|---|---|
| 1 | 10 | 1.7 | 78 |
| 2 | 20 | 1.4 | 90 |
| 3 | 20 | 2.1 | 1 84 |
| 4 | 30 | 0 9. | 95 |
| 5 | 240 | 0.9 | 95 |

1 Minus 65 mesh concentrate.

EXAMPLE 3

A number of runs were made evaluating the effect of temperature on the rate of solubilization of beryllium from the ore concentrate described in Example 1. In these studies, minus 200 mesh ore was placed with sulfuric acid (1 to 6 normal) in a glass vessel which was tightly closed. The vessel was placed in a water bath maintained at a predetermined temperature for a preselected length of time. Following the test period, the product mixture was removed from the test assembly and the amount of solubilized beryllium determined.

Table II summarizes the results of this study and shows the reaction time at predetermined temperatures required to obtain a minimum of 90 percent solubilization of the beryllium in the concentrate.

TABLE II

| Run No. | Reaction temp., °C. | Reaction time (hours) | Final [H +](N) |
|---|---|---|---|
| 1 | 100 | 24 | 1.2 |
| 2 | 150 | 2 | ~1.3 |
| 3 | 230 | 0.3 | 1.4 |

EXAMPLE 4

The effect of sulfuric acid to beryllium oxide ratio on solubilization of beryllium was evaluated using minus 200 mesh Seal Lake Concentrate and 1 to 6 N sulfuric acid following the procedures and techniques described in Example 1. The runs were made at 230° C. and at a pressure of about 470 p.s.i.g. The results of these studies are presented in Table III.

TABLE III

| Run No. | $H_2SO_4$/Beryllium concentrate expressed as $H_2SO_4$ lbs./ton conc. | $H_2SO_4$/BeO molar ratio | Beryllium solubilized, percent | [H+] g./l. |
|---|---|---|---|---|
| 1 | 100 | 1.25 | 10 | 104 |
| 2 | 200 | 2.50 | 38 | 104 |
| 3 | 300 | 3.75 | 85 | 0.5 |
| 4 | 400 | 5.00 | 95 | 0.9 |
| 5 | 600 | 7.50 | 95 | 2.5 |

EXAMPLE 5

Using the same general technique and procedure described in Example 1, a minus 200 mesh U.S. Standard Sieve flotation concentrate of beryllium ore containing about 0.4 weight percent beryllium and iron (II), aluminum, thorium and rare earth metals as the impurities was leached in the absence of an oxidant at about 95° C. with 4 N sulfuric acid at an equivalent $H_2SO_4$/beryllium concentrate relationship of about 400 lbs. acid/ton concentrate. Analysis of the resulting leachate, normalized to 1 gram/liter of beryllium showed Al—0.15 g./l., Fe—2.9 g./l., rare earths—2.4 g./l. and Th—0.065 g./l. The hydrogen ion normality of the product solution was 0.5. Repeating this run at about 230° C. provides a product solution of substantially lower aluminum, thorium and rare earths content but of somewhat higher iron content. A fresh mixture of concentrate and sulfuric acid in the same concentrations as set forth directly hereinbefore was prepared except that it contained additionally an alkali metal chlorate as an oxidant in quantity sufficient to assure substantially complete oxidation of all the iron (II) to iron (III). This mixture was heated at about 230° C. in the leaching operation. Analysis of the resulting leachate, normalized to 1 gram/liter of beryllium showed Al—0.03 g./l., Fe—0.015 g./l., rare earths 0.36 g./l., Th—0.005 g./l. This product solution also had a hydrogen ion normality of 0.5.

This study emphasizes the fact that if beryllium of high purity is desired with respect to iron impurity it is essential that iron (II) values be oxidized to iron (III) values before or during leaching in accordance with the disclosed novel process.

EXAMPLE 6

About 20 cubic centimeters of 3 N hydrochloric acid, about 50 grams of a minus 200 mesh Seal Lake ore (Be~0.42%) and about 1.9 grams of potassium chlorate ($KClO_3$) were mixed and treated in accordance with the general procedure described in Example 1. The ore, oxidant and acid mixture was heated at a temperature of about 95° C. for about 24 hours. Following this period, the resulting slurry was filtered and washed with about 15 cubic centimeters of water. Analysis of the resulting filtrate product solution, normalized to 1 gram/liter beryllium, gave Fe—2.62 g./l., Al—0.23 g./l., $PO_4^{---}$—0.9 g./l. and rare earth oxides 1.3 g./l. (The thorium content of this solution was not determined.)

The filtrate product from the above leaching operation was heated at about 150° C. for about 3 hours after which time it was filtered and the product solution again analyzed. This filtrate, normalized to 1.0 g./l. beryllium analyzed Fe—0.16 g./l., $PO_4^{---}$—0.058 g./l., Th—0.052 g./l., Al—0.19 g./l. and rare earth oxides 0.1 g./l.

EXAMPLE 7

About 5 grams of Seal Lake ore concentrate (0.35% Be) and 5 cubic centimeters of 4.0 molar nitric acid were reacted at 250° C. for 3 hours using the same general processing technique set forth in Example 1. The resultant product solution was separated from the residual solids by filtration. The solids were washed and the washings added to the product solution. Analysis of the product solution, normalized to 1 g./l. beryllium, indicated Fe—0.034 g./l., $PO_4^{---}$—0.048 g./l., rare earths—0.1 g./l. and Al—0.064 g./l. The hydrogen ion normally was about 0.5.

In this embodiment, the nitric acid not only serves as the acidulating agent but also acts as oxidant as well.

EXAMPLE 8

The head solution from a conventional beryllium ore acid leaching operation was analyzed and found to contain 0.53 g./l. Be; 0.008 g./l. Al; 2.3 g./l. Fe; 0.055 g./l. Th; 1.5 g./l. rare earth oxides, 1.56 g./l. $PO_4^{---}$ and had a hydrogen ion normality of about 0.2.

About 30 cubic centimeters of this solution was admixed with about 0.03 gram of potassium perchlorate (KClO$_4$) and this mixture heated for about 4 hours at about 230° C. following the same general technique described in Example 1. A solid, about 0.13 gram in weight, precipitated during the heating process. This was separated by filtration from the resultant product solution. This solid residue was washed with increments of water and the washings added to the product solution providing a final volume of about 100 cubic centimeters. Analysis of the final solution was equivalent to Be—0.57 g./l., Al—0.013 g./l., Fe—0.078 g./l. Th—0.01 g./l., rare earth oxides—1.1 g./l. and PO$_4^{---}$—0.32 g./l.

A second 30 cubic centimeter portion of the same head solution was admixed with about 0.04 gram of KClO$_4$ and this reaction mass heated in the same manner as described for the preceding run at about 230° C. for about 15 minutes. The solid residue obtained from this run was about 0.15 g. This residue was separated from the product solution and washed. The washings were combined with the original product filtrate to provide a total volume of about 60 cubic centimeters. The analysis of the final product solution was equivalent to Be—0.56 g./l., Fe—0.05 g./l., Th—0.008 g./l., rare earth oxides—0.52 g./l. and PO$_4^{---}$—0.24 g./l. based on the original solution. (No analysis was made for aluminum).

EXAMPLE 9

A beryllium concentrate containing about 0.4% Be after slurrying in water is heated to a temperature of from about 145 to about 230° C. for at least about 20 minutes during which time the slurry is treated with sulfuric acid produced in situ by bubbling a stream of air and SO$_2$ into the heated slurry. Separation of the resulting solution from the residual solids provides a product solution containing substantially all of the beryllium values originally present in the concentrate with little or no contamination from other impurity metals which also were present therein.

Various modifications can be made in the present invention without departing from the spirit or scope thereof for it is understood that we limit ourselves only as defined in the appended claims.

We claim:
1. A process for separating beryllium values from other metal values which comprises:
   (a) providing an aqueous acidic reaction mixture containing solubilized beryllium values and at least one metal selected from the group consisting of ferric iron, aluminum, thorium or rare earths,
   (b) heating said aqueous acidic reaction mixture at a temperature of at least about 145° C., for a minimum period of about 20 minutes while providing a final hydrogen ion concentration at a maximum of about 2 normal and at a minimum of about 0.2 normal thereby retaining beryllium values in solution with impurity metal values being present in the solid state, and
   (c) separating said solubilized beryllium values from the solid residual metal values remaining after the heating period.
2. The process as defined in claim 1 and including the step of heating said aqueous acidic reaction mixture at a temperature of from about 175° C. to about 250° C. in a sealed reactor under autogeneous pressure for a period of from about 20 minutes to about 24 hours.
3. The process as defined in claim 1 and including the step of oxidizing any iron (II) values in the aqueous acidic reaction mixture to iron (III).

References Cited

UNITED STATES PATENTS

| 3,116,111 | 12/1963 | Morana et al. | 23—24 X |
| 3,159,453 | 12/1964 | Biermann | 23—18 |
| 3,395,975 | 8/1968 | Grunig et al. | 23—18 |

OTHER REFERENCES

Sloman, "Journal of the Soc. of Chemical Industry-Transactions," Oct. 18, 1929, pp. 309T–316T.

HERBERT T. CARTER, Primary Examiner

U.S. Cl. X.R.

23—23, 87, 102, 117, 318, 342